United States Patent
Huang

(10) Patent No.: US 9,294,979 B2
(45) Date of Patent: Mar. 22, 2016

(54) INTERFERENCE SUPPRESSION IN A WIRELESS COMMUNICATION NETWORK

(75) Inventor: Haiyang Huang, Chengdu (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/394,548

(22) PCT Filed: Apr. 17, 2012

(86) PCT No.: PCT/CN2012/000524
§ 371 (c)(1),
(2), (4) Date: Oct. 15, 2014

(87) PCT Pub. No.: WO2013/155643
PCT Pub. Date: Oct. 24, 2013

(65) Prior Publication Data
US 2015/0065145 A1    Mar. 5, 2015

(51) Int. Cl.
*H04W 36/00* (2009.01)
*H04W 36/20* (2009.01)
*H04W 52/40* (2009.01)
*H04W 8/26* (2009.01)
(Continued)

(52) U.S. Cl.
CPC ............... *H04W 36/20* (2013.01); *H04W 8/26* (2013.01); *H04W 36/0061* (2013.01); *H04W 36/0072* (2013.01); *H04W 36/32* (2013.01); *H04W 52/40* (2013.01); *H04W 84/005* (2013.01); *H04W 88/08* (2013.01)

(58) Field of Classification Search
CPC ............ H04W 36/20; H04W 36/0072; H04W 36/0061; H04W 36/32; H04W 8/26; H04W 52/40; H04W 88/08; H04W 84/005
USPC ............................................. 455/438
See application file for complete search history.

(56) References Cited

U.S. PATENT DOCUMENTS

2010/0317351 A1   12/2010  Gerstenberger et al.
2011/0103350 A1*   5/2011  Lindoff ............. H04W 36/0094
                                                      370/332
(Continued)

FOREIGN PATENT DOCUMENTS

CN           1878398 A    12/2006
CN         101720096 A     6/2010
(Continued)

OTHER PUBLICATIONS

International Search Report for International Application No. PCT/CN2012/000524, mailed Jan. 17, 2013, 4 pages.
(Continued)

*Primary Examiner* — Tanmay Shah
(74) *Attorney, Agent, or Firm* — Nicholson De Vos Webster & Elliot LLP

(57) ABSTRACT

An interference suppression method, base station and controlling node of the base station are disclosed. In the method, the controlling node informs via a first control signal the base station which is broadcasting a first synchronization signal containing a first cell identity (ID) and a first reference signal, of broadcasting a second synchronization signal containing a second cell ID and a second reference signal. The controlling node then informs via a second control signal the base station of adjusting signal powers of the first reference signal and the second reference signal to trigger a handover from the first cell ID to the second cell ID.

16 Claims, 3 Drawing Sheets

(51) Int. Cl.
*H04W 36/32* (2009.01)
*H04W 84/00* (2009.01)
*H04W 88/08* (2009.01)

(56) References Cited

U.S. PATENT DOCUMENTS

| | | |
|---|---|---|
| 2011/0124365 A1 | 5/2011 | Gresset et al. |
| 2011/0159901 A1 | 6/2011 | Frenger et al. |
| 2013/0017776 A1* | 1/2013 | Takano ............... H04B 7/15507 455/7 |
| 2013/0028420 A1* | 1/2013 | Vikberg ................ H04W 12/02 380/270 |
| 2013/0252602 A1* | 9/2013 | Meshkati .............. H04W 24/02 455/422.1 |

FOREIGN PATENT DOCUMENTS

| | | |
|---|---|---|
| CN | 102300319 A | 12/2011 |
| WO | WO-2011000161 A1 | 1/2011 |
| WO | 2011/105052 A1 | 9/2011 |
| WO | 2012/041387 A1 | 4/2012 |

OTHER PUBLICATIONS

Extended European Search Report for Application No. PCT/CN2012/000524, mailed Jun. 10, 2015, 4 pages.
Sanneck et al., "Self-Configuration ('Plug-and-Play')", LTE Self-Organising Networks (SON): Network Management Automation for Operational Efficiency, First Edition, Dec. 9, 2011, pp. 81-134.
International Preliminary Report on Patentability, Application No. PCT/CN2012/000524, dated Oct. 21, 2014, 6 pages.

* cited by examiner

INTERFERENCE SUPPRESSION IN A WIRELESS COMMUNICATION NETWORK

CROSS-REFERENCE TO RELATED APPLICATIONS

This application is a National stage of International Application No. PCT/CN2012/000524, filed Apr. 17, 2012, which is hereby incorporated by reference.

TECHNICAL FIELD

The present invention generally relates to interference suppression in a wireless communication network.

BACKGROUND

Cell Identities (IDs) are used in various wireless communication systems to identify cells. For example, in a wireless communication system using Long Term Evolution (LTE) technology, the physical cell identity (PCI) is assigned to and transmitted by all LTE cells. It is a layer 1 radio signature of which there exists 504 unique data sequences, and serves as a cell signature that is detectable for User Equipments (UEs) connectable to the wireless communication system. UEs use the PCI to determine and assess the relation to the serving cell and to identify neighboring cells. The PCIs are geographically reused in the network to avoid conflict. If two cells geographically close to each other use the same PCI, the UEs will have difficulties to identify them, and as a result, serious interference will occur.

Various cell ID allocation methods have been proposed and as a principle the conflict in cell IDs should be avoided. However, in some scenarios the conflict appears to be more difficult to avoid. One typical scenario is the "mobile" base station in vehicles such as a train.

Due to the high demand for mobile wireless services such as online game and Internet surfing especially in a long time travelling, a reliable and high data rate wireless service is necessary for train passengers. Typically at least one mobile base station is deployed on the top of carriages to implement wireless backhaul to base stations along with the railway. This is similar to the femtocell, which is a home base station for indoor coverage extension and wideband data service. However, unlike the femtocell, the mobile base station moves with the train. It is possible that the mobile base station allocated with a cell ID happens to travel through an area covered by a base station allocated with the same cell ID. In this case, the mobile base station uses the same cell ID and in turn the same wireless resource as the outside base station does. Since the signal penetration loss from inside carriages to outside carriages is not enough to avoid interference to the outside base station and vice versa, resource conflict occurs inevitably, which may result in wireless service breaking off. The chance that cell ID conflict occurs will be high if the train travels through a long distance.

One solution for the problem is to reserve certain cell IDs for trains. However, considering the limited number of available cell IDs, e.g. 504 PCIs in LTE, the solution is almost infeasible.

SUMMARY

Therefore, it is an object to solve at least one of the above-mentioned problems.

According to an aspect of the invention, an interference suppression method operative by a controlling node of a base station in a wireless communication network is provided. The base station is broadcasting a first synchronization signal containing a first cell ID and a first reference signal. The controlling node informs, via a first control signal, the base station of broadcasting a second synchronization signal containing a second cell ID and a second reference signal. The controlling node informs via a second control signal, the base station of adjusting signal powers of the first reference signal and the second reference signal to trigger a handover from the first cell ID to the second cell ID.

According to another aspect of the invention, an interference suppression method operative by a base station in a wireless communication network is provided. The base station broadcasts a first synchronization signal containing a first cell ID and a first reference signal. Then the base station in response to a first control signal from a controlling node of the base station, broadcasts a second synchronization signal containing a second cell ID and a second reference signal, and in response to a second control signal from the controlling node, adjust signal powers of the first reference signal and the second reference signal to trigger a handover from the first cell ID to the second cell ID.

According to still another aspect of the invention, a controlling node of a base station in a wireless communication network is provided. The base station broadcasts a first synchronization signal containing a first cell ID and a first reference signal. The controlling node comprises a controlling unit operative to generate a first control signal for informing the base station of broadcasting a second synchronization signal containing a second cell ID and a second reference signal, and generate a second control signal for informing the base station of adjusting signal powers of the first reference signal and the second reference signal to trigger a handover from the first cell ID to the second cell ID. The controlling node further comprises a transmitter operative to transmit the first control signal and the second control signal to the base station.

According to still another aspect of the invention, a base station in a wireless communication network is provided. The base station comprises a transmitter operative to broadcast a first synchronization signal containing a first cell ID and a first reference signal, and a receiver operative to receive from a controlling node of the base station a first control signal and a second control signal. The transmitter is further operative to in response to the first control signal, broadcast a second synchronization signal containing a second cell ID and a second reference signal. The base station further comprises a power adjusting unit operative to in response to the second control signal, adjust signal powers of the first reference signal and the second reference signal to trigger a handover from the first cell ID to the second cell ID.

BRIEF DESCRIPTION OF THE DRAWINGS

The invention will be described in detail by reference to the following drawings, in which.

DETAILED DESCRIPTION

Figure 1:
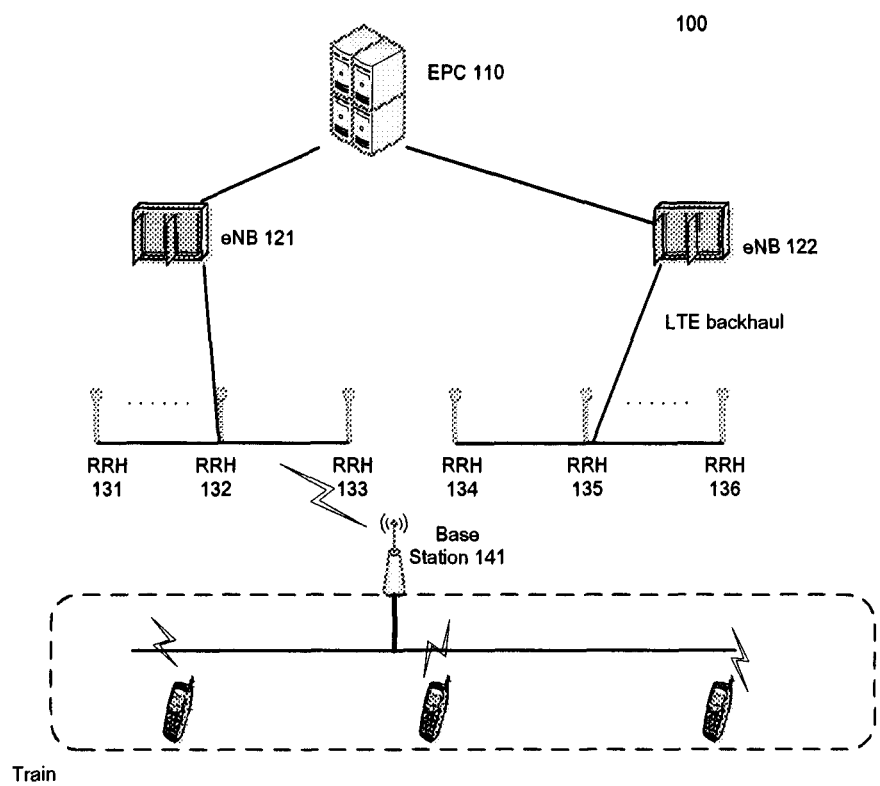
FIG. 1 shows a schematic view of a wireless communication network 100 deployed inside and outside a train in accordance with an embodiment of the invention.

Embodiments of the present invention will be described more fully hereinafter with reference to the accompanying drawings, in which embodiments of the invention are shown. This invention may, however, be embodied in many different forms and should not be construed as limited to the embodiments set forth herein. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to block diagrams and/or flowchart illustrations of methods, apparatus (systems) and/or computer program products according to embodiments of the invention. It is understood that blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Although the invention is described with reference to the LTE communication network in the context, the skilled in the art should understand that the invention is not limited to this, but can indeed be applied to all existing and future communication networks. Although specific terms in some specifications are used here, such as Evolved Packet Core (EPC), evolved Node B (eNB), Radio Remote Head (RRH), it should be understand that the invention is not limited to those specific terms but can be applied to all similar entities.

Embodiments of the invention will be described below with reference to the drawings.

A solution for the above-mentioned problem is to change the cell ID of the base station inside the train before the train enters into coverage of the base station with the same cell ID, however, the UEs being served by the base station may encounter a connection interruption at the time of changing the cell ID since they are unaware of the corresponding cell ID and resource modification. Such a connection interruption is not desirable, especially for those real-time services. Embodiments of the invention propose a mechanism for interference suppression which solves potential cell ID and resource conflict at least by triggering a virtual handover (HO) process to smoothly change the cell ID.

FIG. 1 shows a schematic view of a wireless communication network 100 deployed inside and outside a train in accordance with an embodiment of the invention.

As shown in FIG. 1, the network 100 includes an EPC 110 and a plurality of eNBs 121 and 122. Each of the eNBs 121 and 122 is respectively connected via LTE backhaul to a plurality of RRHs 131-133 and 134-136 which are distributed antenna systems deployed along with railway. A base station 141 is deployed in a train and move along with the train. The base station 141 is connected via air interface to the RRHs that the train is travelling through. In uplink, the base station 141 collects signals from UEs via antennas inside the carriages, converts the signals to IP packets by base band processing, converges and transmits via air interface the IP packets to the RRHs and then to the eNB the train is travelling through. In downlink, the base station 141 receives the signals from the RRHs through the air interface, converts the signals to IP packets by base band processing, diverges and transmits the IP packets to the UEs inside the carriages.

The EPC 110 may predict that a cell ID conflict is to occur based on knowledge of traffic information, such as vehicle speed, vehicle position, and cell ID configuration of eNBs the vehicle is to travel through. The prediction can be made based on any one of the traffic information mentioned above, or based on any combination of them. The traffic information can be collected by the EPC 110 by periodical updating or by proper measurements. For example, the speed and position of the train can be obtained by Global Positioning System (GPS) measurements or by simply checking against the train time schedule, and the cell ID configuration of the eNB is certainly known to the EPC 110.

To avoid the cell ID conflict, the EPC 110 modifies the cell ID of the base station 141 without interrupting the communication between the base station 141 and UEs inside the train by triggering a virtual HO process.

Before the virtual HO process, the base station 141 is already allocated with a cell ID and broadcasts the cell ID in synchronization signal(s), e.g. Primary Synchronization Signal (PSS) and Secondary Synchronization Signal (SSS). The base station 141 also broadcasts a reference signal such as Cell-specific Reference Signal (CRS) for signal power measurement. The UE detects the cell ID from the synchronization signal and knows it is accessing the base station 141 with the cell ID. When the EPC 110 recognizes that the cell ID is the same as that of the eNB the train is to travel through, it allocates a new cell ID to avoid conflict. The new cell ID is preferably different than any of the cell IDs of all eNBs the train is to travel through. The EPC 110 informs the base station 141 of broadcasting another synchronization signal containing the new cell ID and broadcasting another reference signal. The other reference signal to be broadcasted by the base station 141 appears as if a reference signal broadcasted by another cell. It may use unoccupied time-frequency resource elements and be orthogonal to the original reference signal. The UE inside the train will detect the new cell ID and believe it is also located in a cell of another base station and may access that base station as well. The EPC 110 then informs the base station 141 of adjusting signal powers such as Reference Signal Power (RSP) of the two reference signals to simulate a conventional HO scenario.

Figure 2:
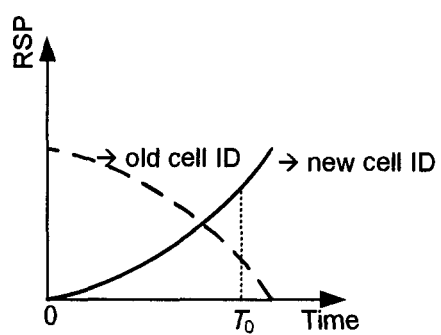
FIG. 2 schematically shows the adjustment to RSP of the two reference signals for triggering a HO procedure.

FIG. 2 schematically shows the adjustment to RSP of the two reference signals for triggering a HO procedure. As shown in FIG. 2, the RSP of the old reference signal as indicated by dashed line is decreased and the RSP of the newly broadcasted reference signal as indicated by solid line is increased. From the perspective of the UE, this is no different than a conventional HO scenario in which the UE moves from the source cell to the target cell. The HO threshold is reached at time T0, then the UE naturally handovers from the old cell ID to the new cell ID, although in fact the UE does not move away from the base station 141. The process of handover is already known in the art and will not be discussed in further details.

By triggering the virtual handover before the train enters the area where cell ID and resource conflict is to occur, the cell ID of the base station 141 is modified without interrupting connection to the UEs in the train. In addition, the whole process is transparent to the UEs, that is, the UEs do not need to be modified and is backward compatible. The virtual handover is discussed in above in contexts of the train-carried base station, however, it should be understood that it can be applied to other scenarios. Other vehicles deployed with micro base station(s) may also use the virtual handover to avoid potential cell ID and resource conflict. In practice the cell ID conflict is generally caused by movement of base station such as the train-carried base station, however, it is possible that the cell ID conflict occurs in a wireless communication without the movement of base station, e.g. due to improper configuration. In any scenario the cell ID and resource conflict will occur or has occurred, the virtual handover disclosed in this invention can be applied to smoothly change the cell ID and therefore suppress interference. The handover can be of any type, including soft handover for 3G and LTE system and hard handover for 2G system or a combination thereof. The virtual handover is illustrated to be triggered by the EPC, however, it should be noted that the controlling node of the base station that triggers the virtual handover may vary among different systems, e.g. a Radio Network Controller (RNC) in a Universal Mobile Telecommunications System (UMTS) radio access network (UTRAN), or Base Station Controller (BSC) in a Global System Mobile (GSM) system.

Figure 3:
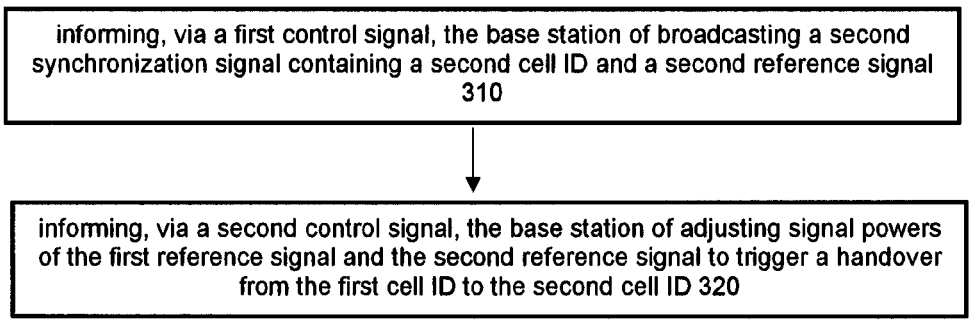
FIG. 3 illustratively shows an interference suppression method operative by a controlling node of a base station in a wireless communication network in accordance with an embodiment of the invention.

FIG. 3 illustratively shows an interference suppression method 300 operative by a controlling node of a base station in a wireless communication network in accordance with an embodiment of the invention. The base station is broadcasting a first synchronization signal containing a first cell ID and broadcasting a first reference signal. At step 310, the controlling node informs, via a first control signal, the base station of broadcasting a second synchronization signal containing a second cell ID and broadcasting a second reference signal. In case the base station is located in a vehicle, the controlling node may allocate the second cell ID based on traffic information, such as vehicle speed, vehicle position, cell ID configuration of base stations the vehicle is to travel through. At step 320, the controlling node informs via a second control signal, the base station of adjusting signal powers of the first reference signal and the second reference signal to trigger a handover from the first cell ID to the second cell ID. In an embodiment, the controlling node informs, via the second control signal, the base station of decreasing the signal power of the first reference signal and increasing the signal power of the second reference signal.

Figure 4:
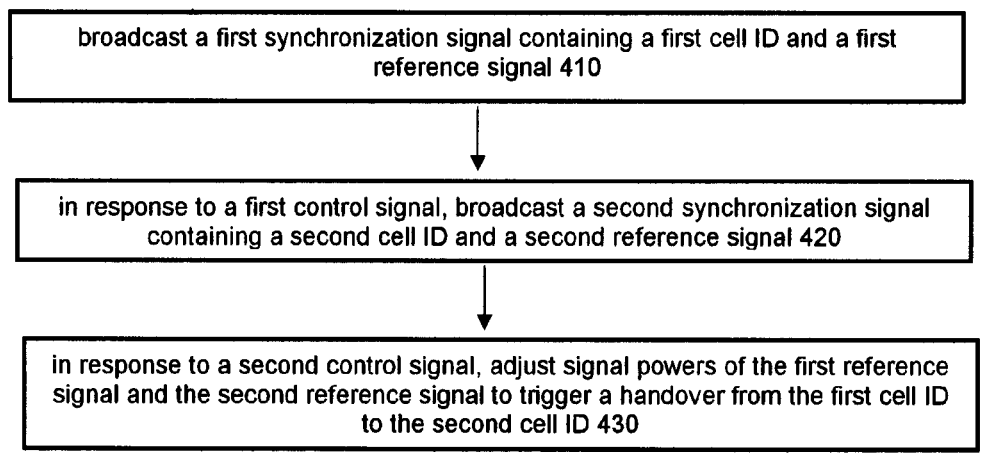
FIG. 4 illustratively shows an interference suppression method operative by a base station in a wireless communication network in accordance with an embodiment of the invention.

FIG. 4 illustratively shows an interference suppression method 400 operative by a base station in a wireless communication network in accordance with an embodiment of the invention. At step 410, the base station broadcasts a first synchronization signal containing a first cell ID and a first reference signal. At step 420, the base station in response to a first control signal from a controlling node of the base station, broadcasts a second synchronization signal containing a second cell ID and a second reference signal. In case that the base station is located in a vehicle, the second cell ID may be allocated by the controlling node based on traffic information. At step 430, the base station in response to a second control signal from the controlling node, adjust signal powers of the first reference signal and the second reference signal to trigger a handover from the first cell ID to the second cell ID. In an embodiment, the base station may decrease the signal power of the first reference signal and increase the signal power of the second reference signal.

Figure 5:
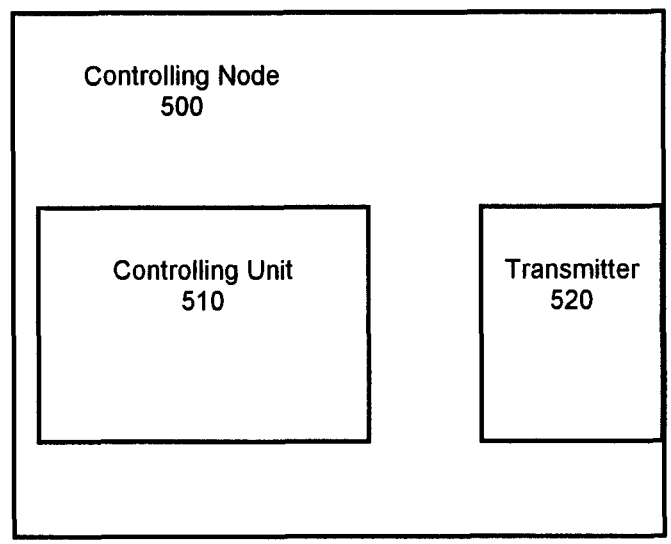
FIG. 5 is a block diagram of a controlling node of a base station in a wireless communication network in accordance with an embodiment of the invention.

FIG. 5 is a block diagram of a controlling node 500 of a base station in a wireless communication network in accordance with an embodiment of the invention. For example, the controlling node may be a BSC and the base station may be a Radio Base Station in a GSM system. In a LTE system, the controlling node and the base station can be integrated into an eNB. The base station broadcasts a first synchronization signal containing a first cell ID and a first reference signal. The controlling node 500 comprises a controlling unit 510 operative to generate a first control signal for informing the base station of broadcasting a second synchronization signal containing a second cell ID and a second reference signal, and generate a second control signal for informing the base station of adjusting signal powers of the first reference signal and the second reference signal to trigger a handover from the first cell ID to the second cell ID. The controlling node 500 further comprises a transmitter 520 operative to transmit the first control signal and the second control signal to the base station. In case that the base station is located in a vehicle, the controlling unit 510 may be further operative to allocate the second cell ID based on traffic information. The controlling unit 510 may be operative to generate the second control signal for informing the base station of decreasing the signal power of the first reference signal and increasing the signal power of the second reference signal.

Figure 6:
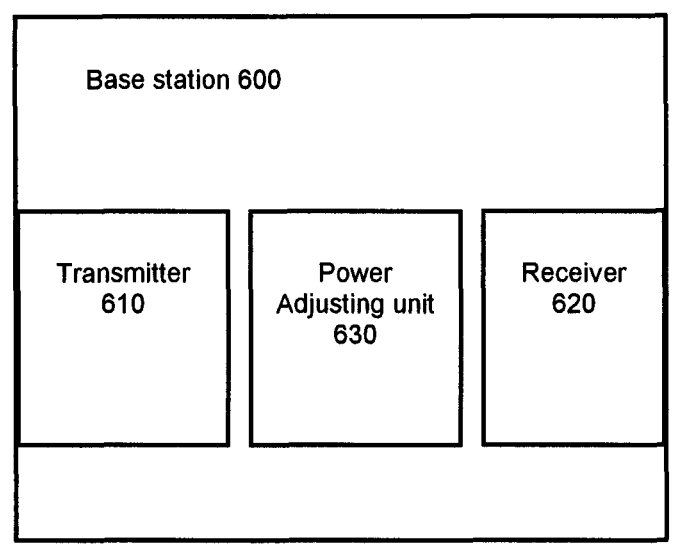
FIG. 6 is a block diagram of a base station in a wireless communication network in accordance with an embodiment of the invention.

FIG. 6 is a block diagram of a base station 600 in a wireless communication network in accordance with an embodiment of the invention. The base station comprises a transmitter 610 operative to broadcast a first synchronization signal containing a first cell ID and a first reference signal, and a receiver 620 operative to receive from a controlling node of the base station a first control signal and a second control signal. The transmitter 610 is further operative to in response to the first control signal, broadcast a second synchronization signal containing a second cell ID and a second reference signal. The base station further comprises a power adjusting unit 630 operative to in response to the second control signal, adjust signal powers of the first reference signal and the second reference signal to trigger a handover from the first cell ID to the second cell ID. In case that the base station is located in a vehicle, the second cell ID may be allocated by the controlling node based on traffic information. The power adjusting unit 630 may be operative to in response to the second control signal, decrease the signal power of the first reference signal while increasing the signal power of the second reference signal.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from its central scope. Therefore it is intended that the present invention not be limited to the particular embodiment disclosed as the best mode contemplated for carrying out the present invention, but that the present invention include all embodiments falling within the scope of the appended claims.

The invention claimed is:

1. An interference suppression method operative by a controlling node of a base station in a wireless communication network, the base station being operative to broadcast a first synchronization signal containing a first cell Identity (ID) and a first reference signal, wherein the base station moves from one cell to another cell, the method comprising:
informing, via a first control signal, the base station of broadcasting a second synchronization signal containing a second cell ID and a second reference signal, wherein the second reference signal uses unoccupied time-frequency resource element of the base station; and
informing, via a second control signal, the base station of adjusting signal powers of the first reference signal and the second reference signal, wherein the adjusting includes increasing signal power of the second reference signal of the base station and decreasing signal lower of the first reference signal of the base station, and wherein a handover is triggered from the first cell ID to the second cell ID based on change of the signal powers of the first and second reference signals.

2. The method of claim 1, wherein the base station is located in a vehicle, and the method further comprising allocating the second cell ID based on traffic information prior to the informing the base station of broadcasting the second synchronization signal containing the second cell ID.

3. The method of claim 2, wherein the traffic information includes at least one of vehicle speed, vehicle position, and cell ID configuration of base stations the vehicle is to travel through.

4. An interference suppression method operative by a base station in a wireless communication network, wherein the base station moves from one cell to another cell, the method comprising:
broadcasting a first synchronization signal containing a first cell Identity (ID) and a first reference signal;
in response to a first control signal from a controlling node of the base station, broadcasting a second synchronization signal containing a second cell ID and a second reference signal, wherein the second reference signal uses unoccupied time-frequency resource element of the base station; and
in response to a second control signal from the controlling node, adjusting signal powers of the first reference signal and the second reference signal, wherein the adjusting includes increasing signal power of the second reference signal of the base station and decreasing signal power of the first reference signal of the base station, and wherein a handover is triggered from the first cell ID to the second cell ID based on charge of the signal powers of the first and second reference signals.

5. The method of claim 4, wherein the base station is located in a vehicle, and the second cell ID is allocated by the controlling node based on traffic information.

6. The method of claim 5, wherein the traffic information includes at least one of vehicle speed, vehicle position, and cell ID configuration of base stations the vehicle is to travel through.

7. A controlling node of a base station in a wireless communication network, the base station being operative to broadcast a first synchronization signal containing a first cell Identity (ID) and a first reference signal, wherein the base station is to move from one cell to another cell, the controlling node comprising:
a controlling unit operative to:
generate a first control signal for informing the base station of broadcasting a second synchronization signal containing a second cell ID and a second reference signal, wherein the second reference signal uses unoccupied time-frequency resource element of the base station; and
generate a second control signal for informing the base station of adjusting signal powers of the first reference signal and the second reference signal, wherein the adjusting includes increasing, signal power of the second reference signal of the base station and decreasing signal power of the first reference signal of the base station, and wherein a handover is to be triggered from the first cell ID to the second cell ID based on change of the signal powers of the first and second reference signals, and
a transmitter operative to transmit the first control signal and the second control signal to the base station.

8. The controlling node of claim 7, wherein the base station is to be located in a vehicle, and the controlling unit is further operative to allocate the second cell ID based on traffic information.

9. The controlling node of claim 8, wherein the traffic information includes at least one of vehicle speed, vehicle position, and cell ID configuration of base stations the vehicle is to travel through.

10. A base station in a wireless communication network, wherein the base station is to move from one cell to another cell, the base station comprising:
a transmitter operative to broadcast a first synchronization signal containing a first cell Identity (ID) and a first reference signal; and
a receiver operative to receive from a controlling node of the base station a first control signal and a second control signal,
wherein the transmitter is further operative to:
in response to the first control signal, broadcast a second synchronization signal containing a second cell ID and a second reference signal, wherein the second reference signal uses unoccupied time-frequency resource element of the base station; and
wherein the base station further comprises a power adjusting unit operative to:
in response to the second control signal, adjust signal powers of the first reference signal and the second reference signal, wherein the adjusting includes increasing signal power of the second reference signal of the base station and decreasing signal power of the first reference signal of the base station, and wherein a handover is to be triggered from the first cell ID to the second cell ID based on change of the signal powers of the first and second reference signals.

11. The base station of claim 10, wherein the base station is to be located in a vehicle, and the second cell ID is allocated by the controlling node based on traffic information.

12. The base station of claim 11, wherein the traffic information includes at least one of vehicle speed, vehicle position, and cell ID configuration of base stations the vehicle is to travel through.

13. The method of claim 1, wherein the handover from the first cell ID to the second cell ID is a soft handover for a Long Term Evolution (LTE) system.

14. The method of claim 1, wherein the controlling node is an Evolved Packet Core (EPC) system.

15. A non-transitory computer-readable medium having computer program instructions stored therein, which when executed by a processor, cause the processor to perform operations in a controlling node of a base station in a wireless communication network, the base station being operative to broadcast a first synchronization signal containing a first cell Identity (ID) and a first reference signal, wherein the base station moves from one cell to another cell, the operations comprising:

informing, via a first control signal, the base station of broadcasting a second synchronization signal containing a second cell ID and a second reference signal, wherein the second reference signal uses unoccupied time-frequency resource element of the base station; and informing, via a second control signal, the base station of adjusting signal powers of the first reference signal and the second reference signal, wherein the adjusting, includes increasing signal power of the second reference signal of the base station and decreasing signal power of the first reference signal of the base station, and wherein a handover is triggered from the first cell ID to the second cell ID based on change of the signal powers of the first and second reference signals.

16. A non-transitory computer-readable medium having computer program instructions stored therein, which when executed by a processor, causes the processor to perform operations in a base station in a wireless communication network, wherein the base station moves from one cell to another cell, the operations comprising:

broadcasting a first synchronization signal containing a first cell Identity (ID) and a first reference signal;

in response to a first control signal from a controlling node of the base station, broadcasting a second synchronization signal containing a second cell ID and a second reference signal, wherein the second reference signal uses unoccupied time-frequency resource element of the base station; and in response to a second control signal from the controlling node, adjusting signal powers of the first reference signal and the second reference signal, wherein the adjusting includes increasing signal power of the second reference signal of the base station and decreasing signal power of the first reference signal of the base station, and wherein a handover is triggered from the first cell ID to the second cell ID based on change of the signal powers of the first and second reference signals.

* * * * *